(12) United States Patent
Bauer

(10) Patent No.: US 11,524,718 B2
(45) Date of Patent: Dec. 13, 2022

(54) APPARATUS AND METHOD FOR A STEERING CONTROL SYSTEM

(71) Applicant: Carlson Paving Products, Inc., Tacoma, WA (US)

(72) Inventor: Robert Bauer, Saint Croix Falls, WI (US)

(73) Assignee: Carlson Paving Products, Inc., Tacoma, WA (US)

(*) Notice: Subject to any disclaimer, the term of this patent is extended or adjusted under 35 U.S.C. 154(b) by 518 days.

(21) Appl. No.: 16/739,365

(22) Filed: Jan. 10, 2020

(65) Prior Publication Data
US 2020/0223481 A1 Jul. 16, 2020

Related U.S. Application Data

(60) Provisional application No. 62/790,748, filed on Jan. 10, 2019.

(51) Int. Cl.
B62D 11/02 (2006.01)
B62D 1/12 (2006.01)
E01C 19/00 (2006.01)
B62D 5/12 (2006.01)
B62D 6/02 (2006.01)
(Continued)

(52) U.S. Cl.
CPC .............. *B62D 11/02* (2013.01); *B60K 26/02* (2013.01); *B60W 10/20* (2013.01); *B60W 40/105* (2013.01); *B62D 1/12* (2013.01); *B62D 5/09* (2013.01); *B62D 5/12* (2013.01); *E01C 19/00* (2013.01); *E01C 19/42* (2013.01); *F16M 13/022* (2013.01); *B60K 2026/029* (2013.01); *B60W 2520/26* (2013.01); *B60W 2520/28* (2013.01); *B62D 6/02* (2013.01); *E01C 19/255* (2013.01);
(Continued)

(58) Field of Classification Search
CPC . B62D 11/02; B62D 1/12; B62D 5/12; B62D 6/02; B60K 26/02; B60K 2026/029; E01C 19/00; E01C 2301/00
See application file for complete search history.

(56) References Cited

U.S. PATENT DOCUMENTS 3,917,015 A * 11/1975 Hawkins ............... F16H 61/456
180/242
4,828,065 A * 5/1989 Ishihara ................... B62D 6/02
701/42
(Continued)

*Primary Examiner* — Tony H Winner
(74) *Attorney, Agent, or Firm* — Chambliss, Bahner & Stophel, P.C.

(57) ABSTRACT

A steering control system adapted for use on a paving machine having one or more wheels and an automatic pivot steer mode. The preferred steering control system comprises a speed sensor adapted to determine a paving machine speed, a steering cylinder adapted to move between a straight forward position and a fully turned position, a steering cylinder sensor adapted to determine a steering cylinder position, a flow sharing valve in fluid communication with one or more of the one or more wheels and adapted to be moved between an open position and a closed position, and a controller adapted to communicate with the speed sensor, the steering cylinder sensor, and the flow sharing valve. The preferred steering control system is adapted to automatically open and close the flow sharing valve. Automatically moving the flow sharing valve between the open position and the closed position.

20 Claims, 6 Drawing Sheets

(51) Int. Cl.
*B60K 26/02* (2006.01)
*E01C 19/42* (2006.01)
*F16M 13/02* (2006.01)
*B60W 10/20* (2006.01)
*B60W 40/105* (2012.01)
*B62D 5/09* (2006.01)
*E01C 19/25* (2006.01)

(52) U.S. Cl.
CPC ...... *E01C 2301/00* (2013.01); *E01C 2301/16* (2013.01)

(56) References Cited

U.S. PATENT DOCUMENTS

| | | | | |
|---|---|---|---|---|
| 2004/0093139 A1* | 5/2004 | Wildey | ............... | B62D 12/00 |
| | | | | 701/41 |
| 2014/0358354 A1* | 12/2014 | Pierce | ............... | B62D 11/005 |
| | | | | 701/25 |
| 2015/0259881 A1* | 9/2015 | Sharma | ............... | B62D 12/00 |
| | | | | 701/50 |
| 2018/0346020 A1* | 12/2018 | Bebernes | ............... | B62D 11/24 |
| 2020/0056348 A1* | 2/2020 | Veasy | ............... | E02F 9/2004 |
| 2020/0198700 A1* | 6/2020 | Benck | ............... | B66C 9/00 |
| 2020/0291609 A1* | 9/2020 | Tevis | ............... | E02F 3/841 |

* cited by examiner

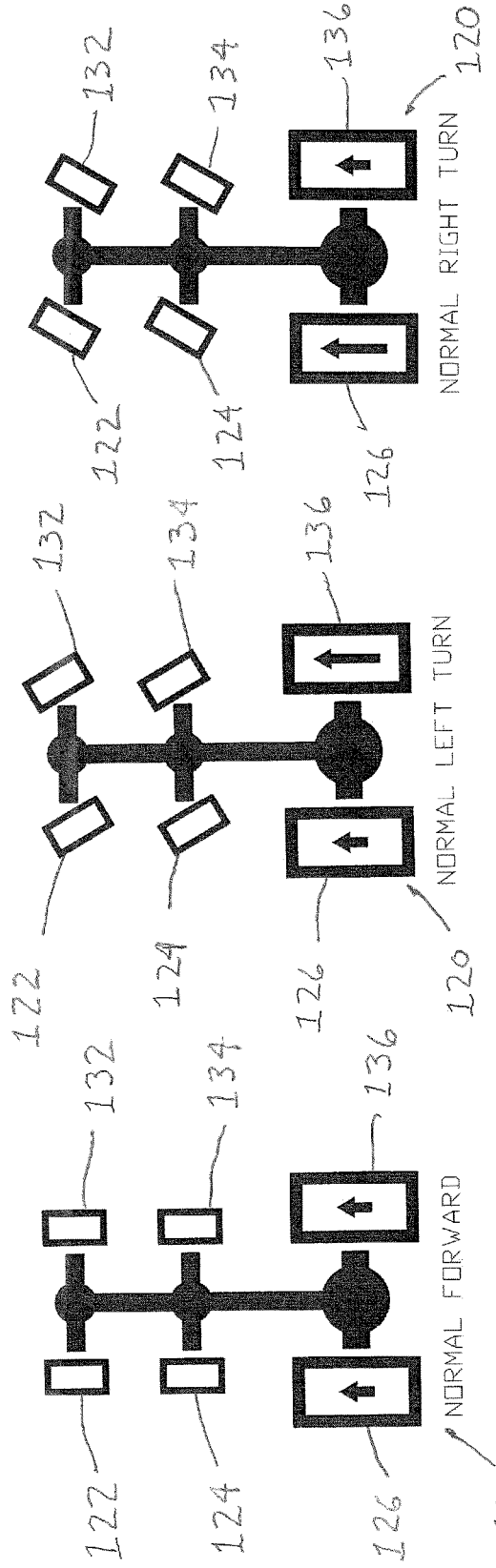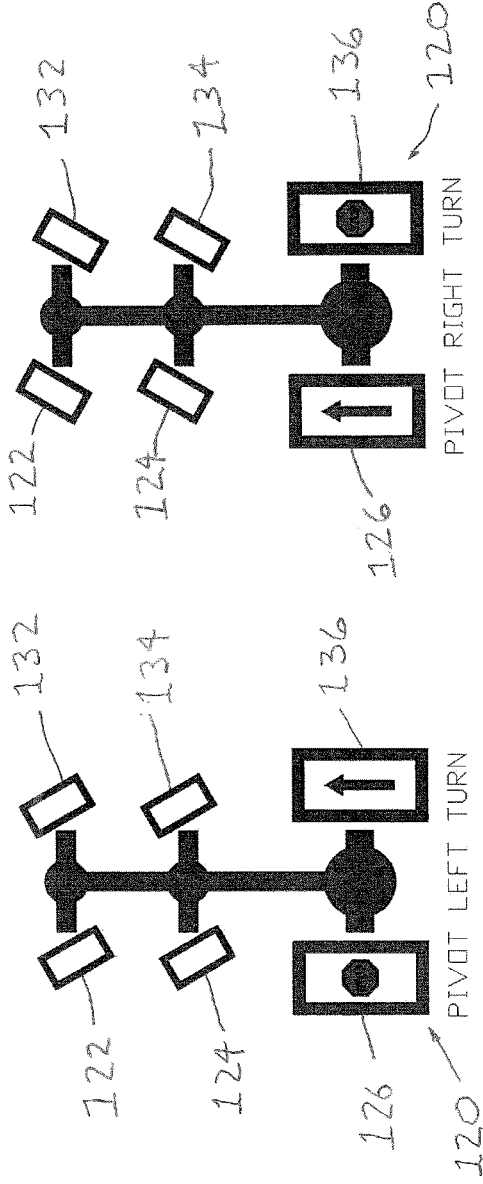

APPARATUS AND METHOD FOR A STEERING CONTROL SYSTEM

CROSS-REFERENCES TO RELATED APPLICATIONS/PATENTS

This application relates back to and claims the benefit of priority from U.S. Provisional Application for Patent Ser. No. 62/790,748 titled "Paving Machine Control Systems" and filed on Jan. 10, 2019.

FIELD OF THE INVENTION

The present invention relates generally to apparatuses and methods for controlling the movement of paving machines, and particularly to apparatuses and methods for automatic pivot steering of paving machines.

BACKGROUND AND DESCRIPTION OF THE PRIOR ART

It is known to use apparatuses and methods to control the steering of paving machines. Conventional apparatuses and methods, however, suffer from one or more disadvantages. For example, conventional control systems and methods do not automatically pivot steer the paving machine. Conventional control systems and methods are also undesirably labor-intensive and unsafe as they require the operator to remove his hands from the paving machine's motion controls, e.g. the steering wheel or directional joystick. Further, conventional control systems and methods allow for pivot steering at any time the paving machine is moving and regardless of the machine's wheel position. Still further, conventional control systems and methods produce undesirable stress on a stationary wheel and its linkage when a pivoting wheel turns. In addition, this damages the base pavement more than if the wheels are turned hard over during a pivot steer. Still further, an operator can accidentally engage pivot steer at an unsafe speed and possibly be thrown off the paving machine.

It would be desirable, therefore, if an apparatus and method for a steering control system could be provided that would automatically pivot steer the paving machine. It would also be desirable if such an apparatus and method for a steering control system could be provided that would not be undesirably labor-intensive and unsafe. It would be further desirable if such an apparatus and method for a steering control system could be provided that would not allow for pivot steering at any time the paving machine is moving and regardless of the machine's wheel position. It would be still further desirable if such an apparatus and method for a steering control system could be provided that would not produce undesirable stress on a stationary wheel and its linkage when a pivoting wheel turns or damage the base pavement. In addition, it would be desirable if such an apparatus and method for a steering control system could be provided that would not be capable of being accidentally engaged at an unsafe speed and possibly throw the operator off the paving machine.

ADVANTAGES OF THE PREFERRED EMBODIMENTS OF THE INVENTION

Accordingly, it is an advantage of the preferred embodiments of the invention claimed herein to provide an apparatus and method for a steering control system that automatically pivot steers the paving machine. It is also an advantage of the preferred embodiments of the invention claimed herein to provide an apparatus and method for a steering control system that is not undesirably labor-intensive and unsafe. It is another advantage of the preferred embodiments of the invention claimed herein to provide an apparatus and method for a steering control system that does not allow for pivot steering at any time the paving machine is moving and regardless of the machine's wheel position. It is still another advantage of the preferred embodiments of the invention claimed herein to provide an apparatus and method for a steering control system that does not produce undesirable stress on a stationary wheel and its linkage when a pivoting wheel turns or damage the base pavement. It is yet another advantage of the preferred embodiments of the invention claimed herein to provide an apparatus and method for a steering control system that is not be capable of being accidentally engaged at an unsafe speed and possibly throw the operator off the paving machine.

Additional advantages of the preferred embodiments of the invention will become apparent from an examination of the drawings and the ensuing description.

EXPLANATION OF THE TECHNICAL TERMS

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

As used herein, the term "controller" means any device, mechanism, assembly, or combination thereof that directs the transmission of information over the data links of a network. The term "controller" includes, without limitation, any device, mechanism, assembly, or combination thereof that is controlled by a program either within the device, mechanism, assembly, or combination thereof or in a processor to which the controller is connected.

As used herein, the term "sensor" means any device, mechanism, assembly, or combination thereof that converts an input signal into a measurable quantity and changes the measurable quantity into a useful signal for an information-gathering system.

As used herein, the term "valve" means any device, mechanism, assembly, or combination thereof that allows, halts, or regulates the passage of fluid through a tube or pipe, either manually or automatically.

SUMMARY OF THE INVENTION

The apparatus of the invention comprises a steering control system adapted for use on a paving machine having one or more wheels and an automatic pivot steer mode. The preferred steering control system comprises a speed sensor that is adapted to determine a paving machine speed, a steering cylinder that is adapted to move between a straight forward position and a fully turned position, a steering cylinder sensor that is adapted to determine a steering cylinder position, a flow sharing valve that is in fluid communication with one or more of the one or more wheels and is adapted to be moved between an open position and a closed position, and a controller that is adapted to communicate with the speed sensor, the steering cylinder sensor, and the flow sharing valve. The preferred steering control system is adapted to automatically open and close the flow sharing valve.

The method of the invention comprises a method for controlling the steering of a paving machine having one or more wheels and an automatic pivot steer mode. The preferred method comprises providing a steering control system. The preferred steering control system comprises a speed sensor that is adapted to determine a paving machine speed, a steering cylinder that is adapted to move between a straight forward position and a fully turned position, a steering cylinder sensor that is adapted to determine a steering cylinder position, a flow sharing valve that is in fluid communication with one or more of the one or more wheels and is adapted to be moved between an open position and a closed position, and a controller that is adapted to communicate with the speed sensor, the steering cylinder sensor, and the flow sharing valve. The preferred steering control system is adapted to automatically open and close the flow sharing valve. The preferred method further comprises automatically moving the flow sharing valve between the open position and the closed position.

BRIEF DESCRIPTION OF THE DRAWINGS

The presently preferred embodiments of the invention are illustrated in the accompanying drawings, in which like reference numerals represent like parts throughout, and in which:

FIG. 5A is a schematic view of an exemplary paving machine in the normal forward position.

FIG. 5B is a schematic view of an exemplary paving machine in the normal left turn position.

FIG. 5C is a schematic view of an exemplary paving machine in the normal right turn position.

FIG. 5D is a schematic view of an exemplary paving machine in the pivot left turn position.

FIG. 5E is a schematic view of an exemplary paving machine in the pivot right turn

DESCRIPTION OF THE PREFERRED EMBODIMENTS OF THE INVENTION

Figure 1:
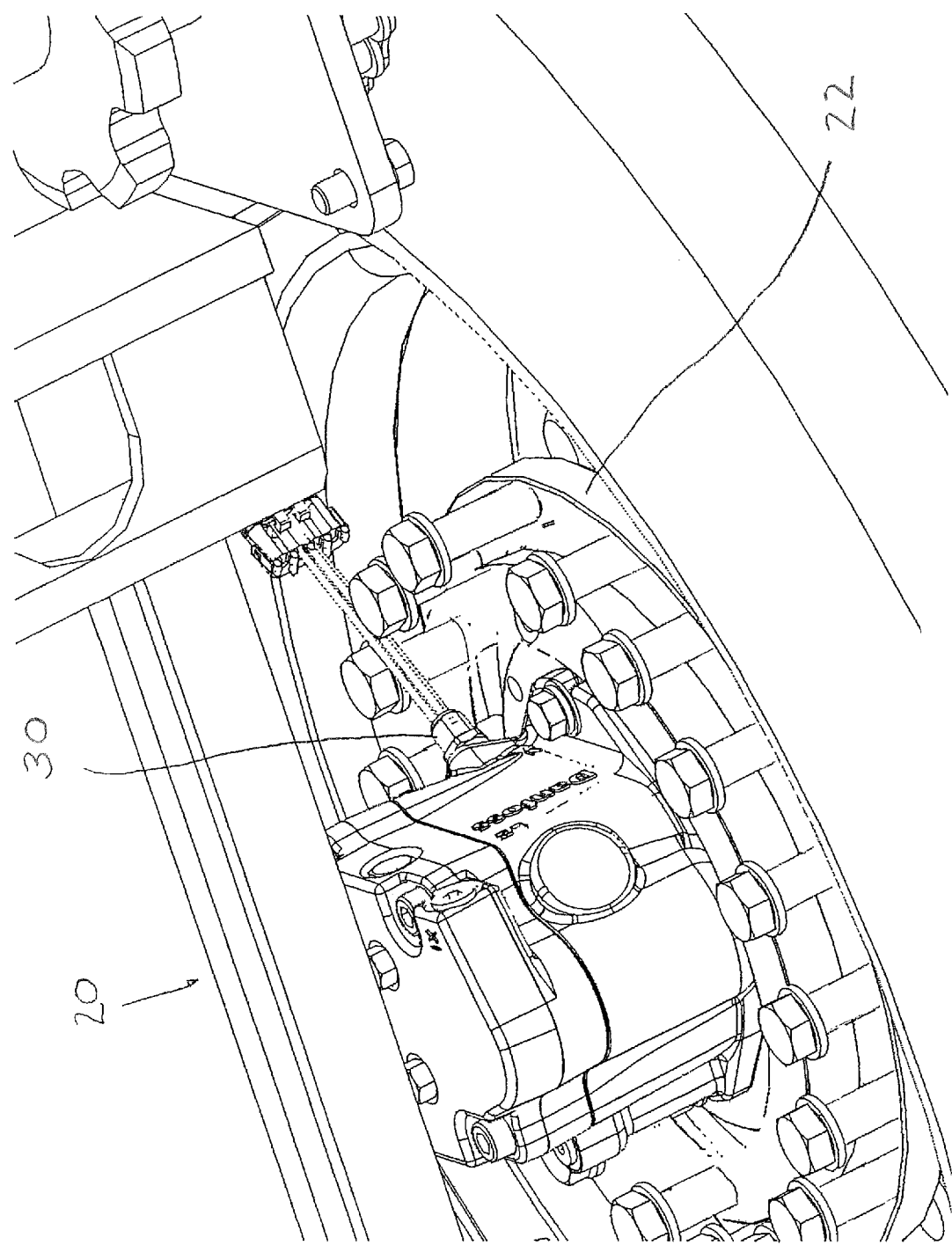
FIG. 1 is a perspective view of a wheel of an exemplary paving machine illustrating the preferred embodiment of the speed sensor in accordance with the present invention.

Referring now to the drawings, the preferred embodiment of the steering control system in accordance with the present invention is illustrated by FIGS. 1 through 6. As shown in FIGS. 1-6, the preferred steering control system is adapted for use on a paving machine having one or more wheels and an automatic pivot steer mode. The preferred steering control system comprises a speed sensor, a steering cylinder, a steering cylinder sensor, a flow sharing valve, and a controller. The preferred steering control system is adapted to automatically open and close the flow sharing valve.

Referring now to FIG. 1, a perspective view of a wheel of an exemplary paving machine having a speed sensor is illustrated. As shown in FIG. 1, the exemplary paving machine is designated generally by reference numeral 20, the preferred wheel is designated generally by reference numeral 22, and the preferred speed sensor is designated generally by reference numeral 30. Preferred speed sensor 30 is adapted to determine a paving machine speed. In the preferred steering control system, the system automatically determines if the paving machine speed is within a paving machine speed range that will allow for safe pivot steering. Preferably, the paving machine speed range is between approximately zero feet per minute (0 fpm) and approximately four hundred feet per minute (400 fpm). Also in the preferred steering control system, the system automatically deactivates the automatic pivot steer mode when the paving machine speed is not within the paving machine speed range. Further, in the preferred steering control system, the system automatically determines a target threshold speed and automatically compares the paving machine speed with the target threshold speed. Still further, in the preferred steering control system, the system automatically deactivates the automatic pivot steer mode when the paving machine speed exceeds the target threshold speed. Preferably, the target threshold speed is between approximately zero feet per minute (0 fpm) and approximately three hundred fifty feet per minute (350 fpm). The preferred steering control system is also adapted to automatically stop the rotation of one or more of the one or more wheels.

Figure 2:
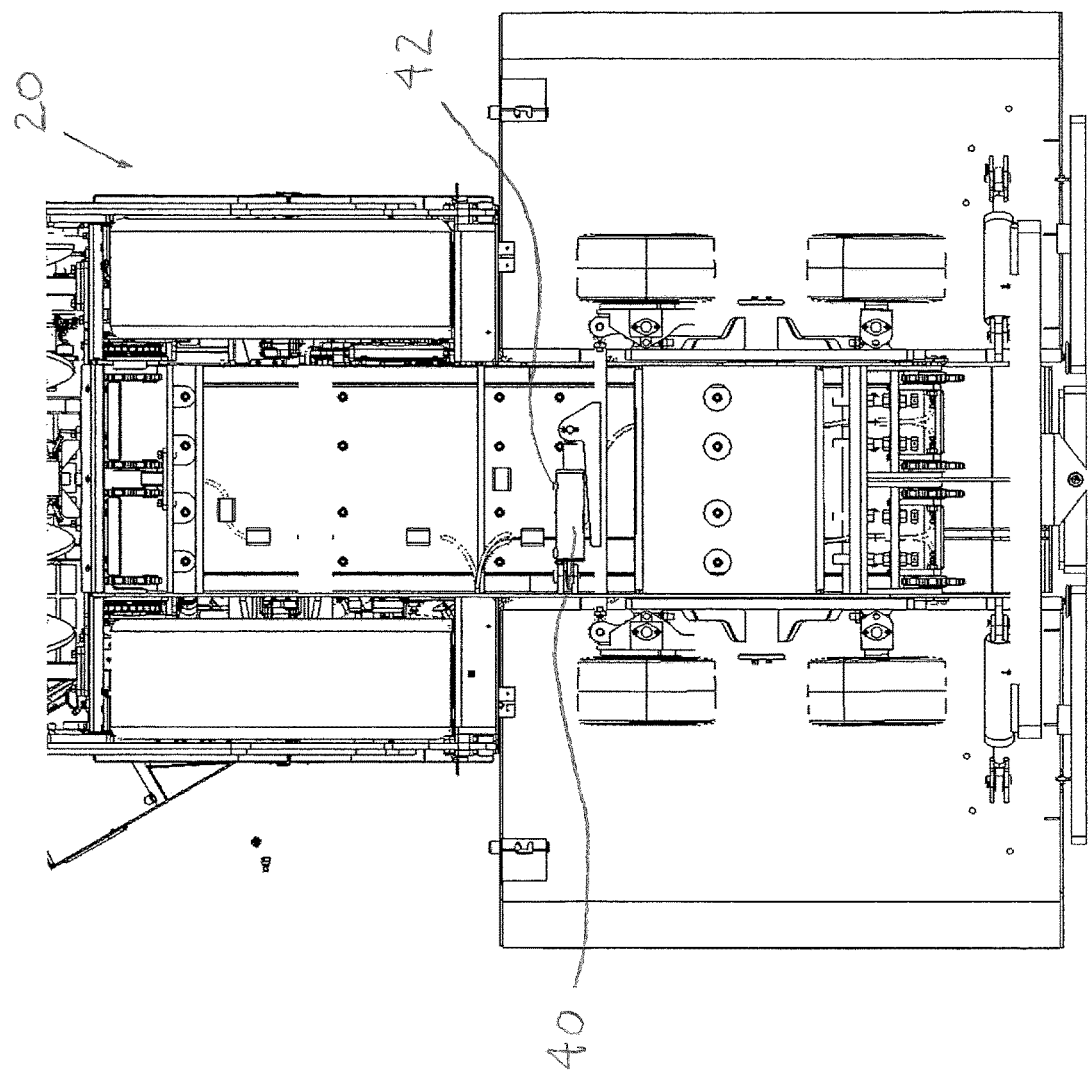
FIG. 2 is a bottom view of the exemplary paving machine illustrated in FIG. 1 showing the preferred embodiment of the steering cylinder and the steering cylinder sensor.

Referring now to FIG. 2, a bottom view of exemplary paving machine 20 is illustrated showing the preferred embodiment of the steering cylinder and the steering cylinder sensor. As shown in FIG. 2, the preferred steering cylinder is designated generally by reference numeral 40 and the preferred steering cylinder sensor is designated generally reference numeral 42. Preferred steering cylinder 40 is adapted to move between a straight forward position and a fully turned position. Preferred steering cylinder sensor 42 is adapted to determine a steering cylinder position. In the preferred steering control system, the system automatically activates the automatic pivot mode when the steering cylinder position is approximately eighty percent (80%) to approximately one hundred percent (100%) in the fully turned position (or approximately twenty-four degrees (24°) or more).

Figure 3:
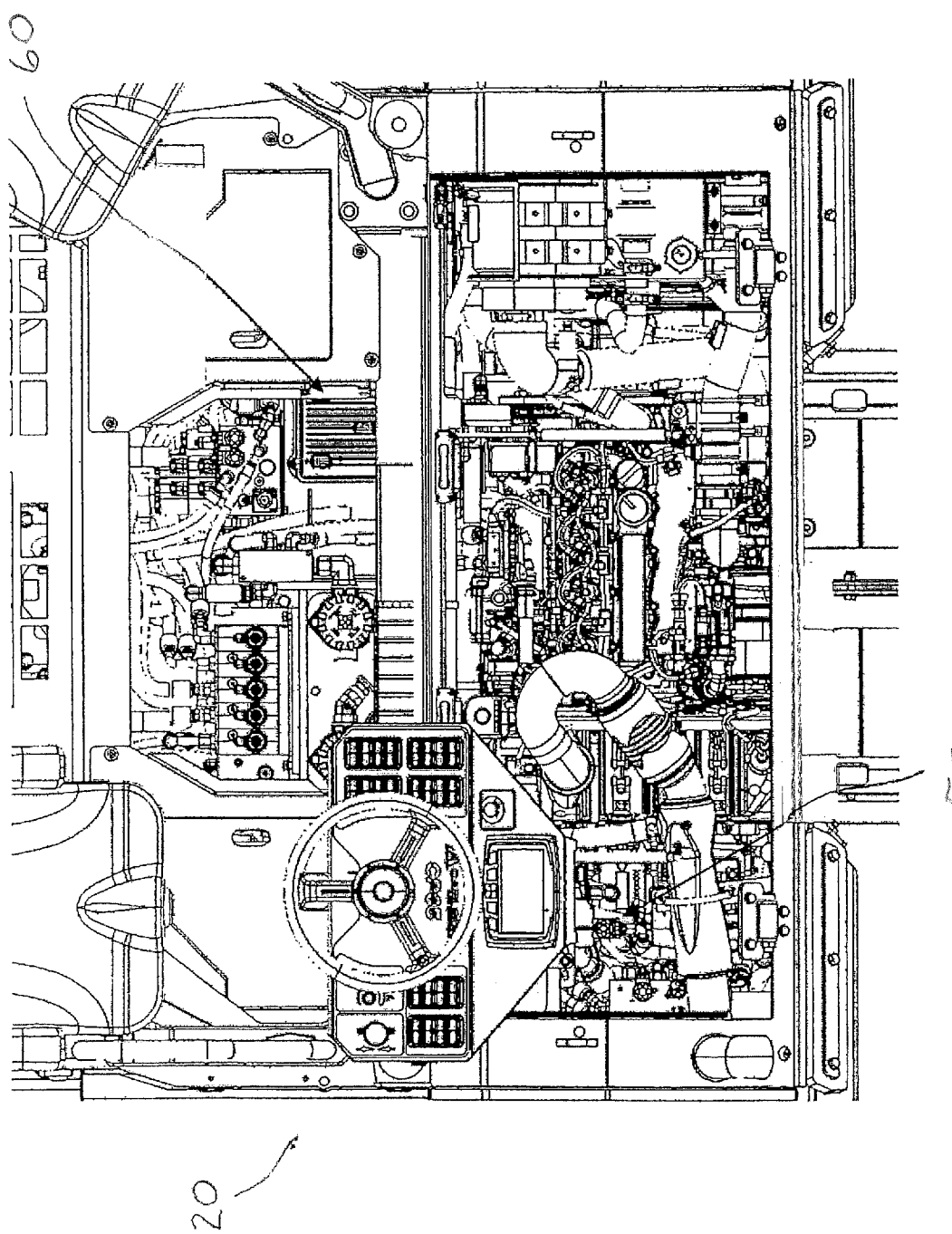
FIG. 3 is a partial sectional top view of the engine compartment of the exemplary paving machine illustrated in FIGS. 1-2 showing the preferred embodiment of the flow sharing valve and the controller.

Referring now to FIG. 3, a partial sectional top view of the engine compartment of exemplary paving machine 20 is illustrated showing the preferred embodiments of the flow sharing valve and the controller. As shown in FIG. 3, the preferred flow sharing valve is designated generally by reference numeral 50 and the preferred controller is designated generally by reference numeral 60. Preferred flow sharing valve is in fluid communication with one or more of the one or more wheels and is adapted to be moved between an open position and a closed position. Preferred controller 60 is adapted to communicate with speed sensor 30, steering cylinder sensor 42, and flow sharing valve 50.

Figure 4:
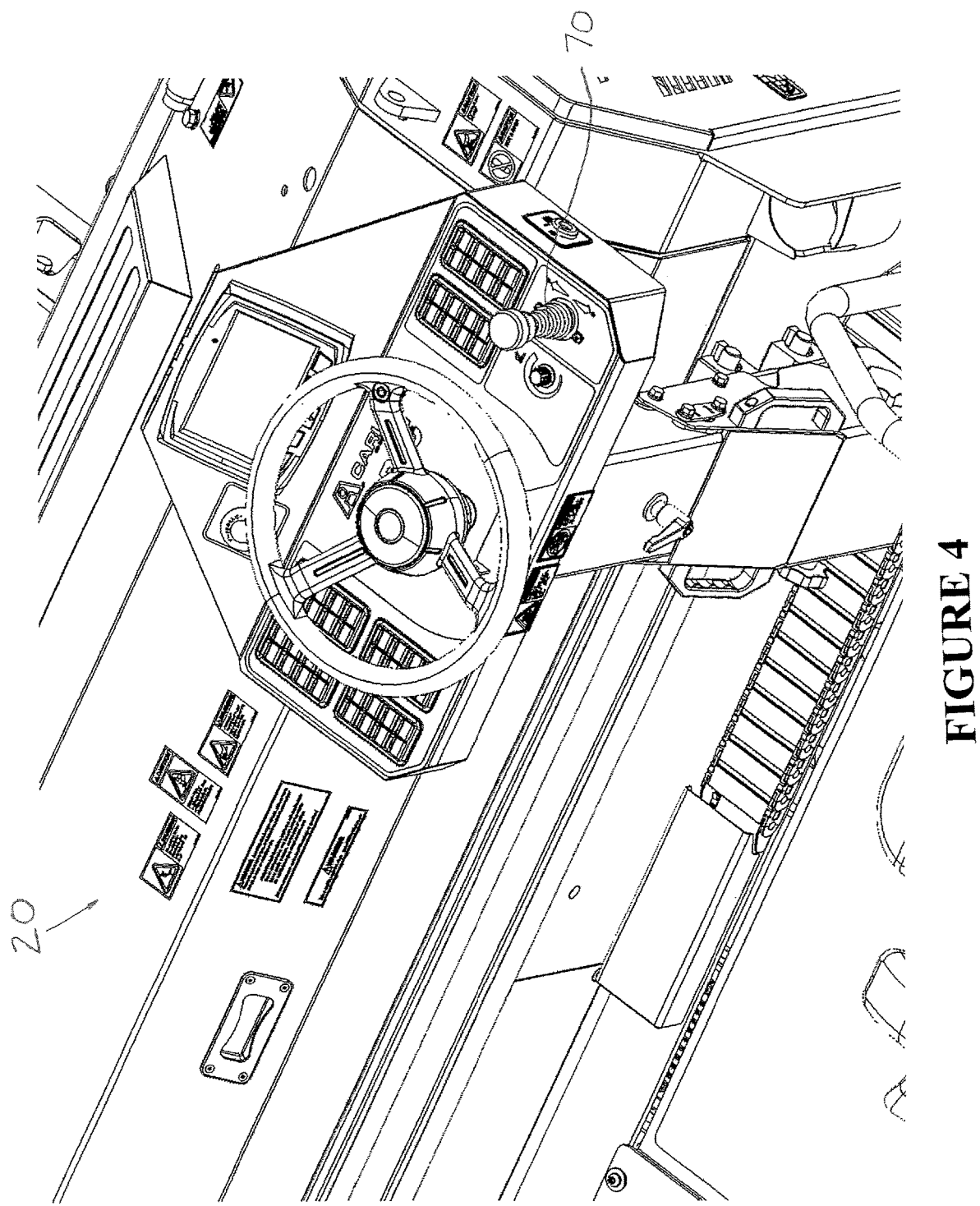
FIG. 4 is a perspective view of cockpit of the exemplary paving machine illustrated in FIGS. 1-3 showing the preferred embodiment of the joystick.

Referring now to FIG. 4, a perspective view of the cockpit of exemplary paving machine 20 is illustrated showing the preferred embodiment of the joystick. As shown in FIG. 4, the preferred joystick is designated generally by reference numeral 70. Preferred joystick 70 is adapted to control the forward-reverse movement of the paving machine.

Referring now to FIG. 5A, a schematic view of an exemplary paving machine in the normal forward position is illustrated. As shown in FIG. 5A, the exemplary paving machine is designated generally by reference numeral 120. Exemplary paving machine 120 comprises front left wheel 122, middle left wheel 124, rear left wheel 126, front right wheel 132, middle right wheel 134, and rear right wheel 136. In the normal forward position, all six wheels are substantially parallel to each other and the longitudinal axis of exemplary paving machine 120. In addition, in the normal forward position, all six wheels are allowed to rotate.

Referring now to FIG. 5B, a schematic view of an exemplary paving machine in the normal left turn position is illustrated. As shown in FIG. 5B, the exemplary paving machine is designated generally by reference numeral 120. Exemplary paving machine 120 comprises front left wheel 122, middle left wheel 124, rear left wheel 126, front right wheel 132, middle right wheel 134, and rear right wheel 136. In the normal left turn position, front left wheel 122, middle left wheel 124, front right wheel 132, and middle right wheel 134 are turned to the left at an angle relative to the longitudinal axis of exemplary paving machine 120. In addition, in the normal left turn position, all six wheels are allowed to rotate.

Referring now to FIG. 5C, a schematic view of an exemplary paving machine in the normal right turn position is illustrated. As shown in FIG. 5C, the exemplary paving machine is designated generally by reference numeral 120. Exemplary paving machine 120 comprises front left wheel 122, middle left wheel 124, rear left wheel 126, front right wheel 132, middle right wheel 134, and rear right wheel 136. In the normal right turn position, front left wheel 122, middle left wheel 124, front right wheel 132, and middle right wheel 134 are turned to the right at an angle relative to the longitudinal axis of exemplary paving machine 120. In addition, in the normal right turn position, all six wheels are allowed to rotate.

Referring now to FIG. 5D, a schematic view of an exemplary paving machine in the pivot left turn position is illustrated. As shown in FIG. 5D, the exemplary paving machine is designated generally by reference numeral 120. Exemplary paving machine 120 comprises front left wheel 122, middle left wheel 124, rear left wheel 126, front right wheel 132, middle right wheel 134, and rear right wheel 136. In the pivot left turn position, front left wheel 122, middle left wheel 124, front right wheel 132, and middle right wheel 134 are turned to the left at an angle relative to the longitudinal axis of exemplary paving machine 120. In addition, in the pivot left turn position, rear left wheel 126 is not permitted to rotate while the other five (5) wheels are allowed to rotate.

Referring now to FIG. 5E, a schematic view of an exemplary paving machine in the pivot right turn position is illustrated. As shown in FIG. 5E, the exemplary paving machine is designated generally by reference numeral 120. Exemplary paving machine 120 comprises front left wheel 122, middle left wheel 124, rear left wheel 126, front right wheel 132, middle right wheel 134, and rear right wheel 136. In the pivot right turn position, front left wheel 122, middle left wheel 124, front right wheel 132, and middle right wheel 134 are turned to the right at an angle relative to the longitudinal axis of exemplary paving machine 120. In addition, in the pivot right turn position, rear right wheel 136 is not permitted to rotate while the other five (5) wheels are allowed to rotate.

The invention also comprises a method for controlling the steering of a paving machine having one or more wheels and an automatic pivot steer mode. The preferred method comprises providing a steering control system as described and claimed herein. The preferred method further comprises automatically moving the flow sharing valve between the open position and the closed position. In other preferred embodiments, the method also comprises automatically determining a paving machine speed, automatically determining a target threshold speed, and automatically determining the steering cylinder position. In still other preferred embodiments, the method comprises automatically comparing the paving machine speed with the paving machine speed range, automatically comparing the paving machine speed with the target threshold speed, automatically comparing the steering cylinder position with the fully turned position, and automatically stopping the rotation of one or more of the one or more wheels.

Figure 6:
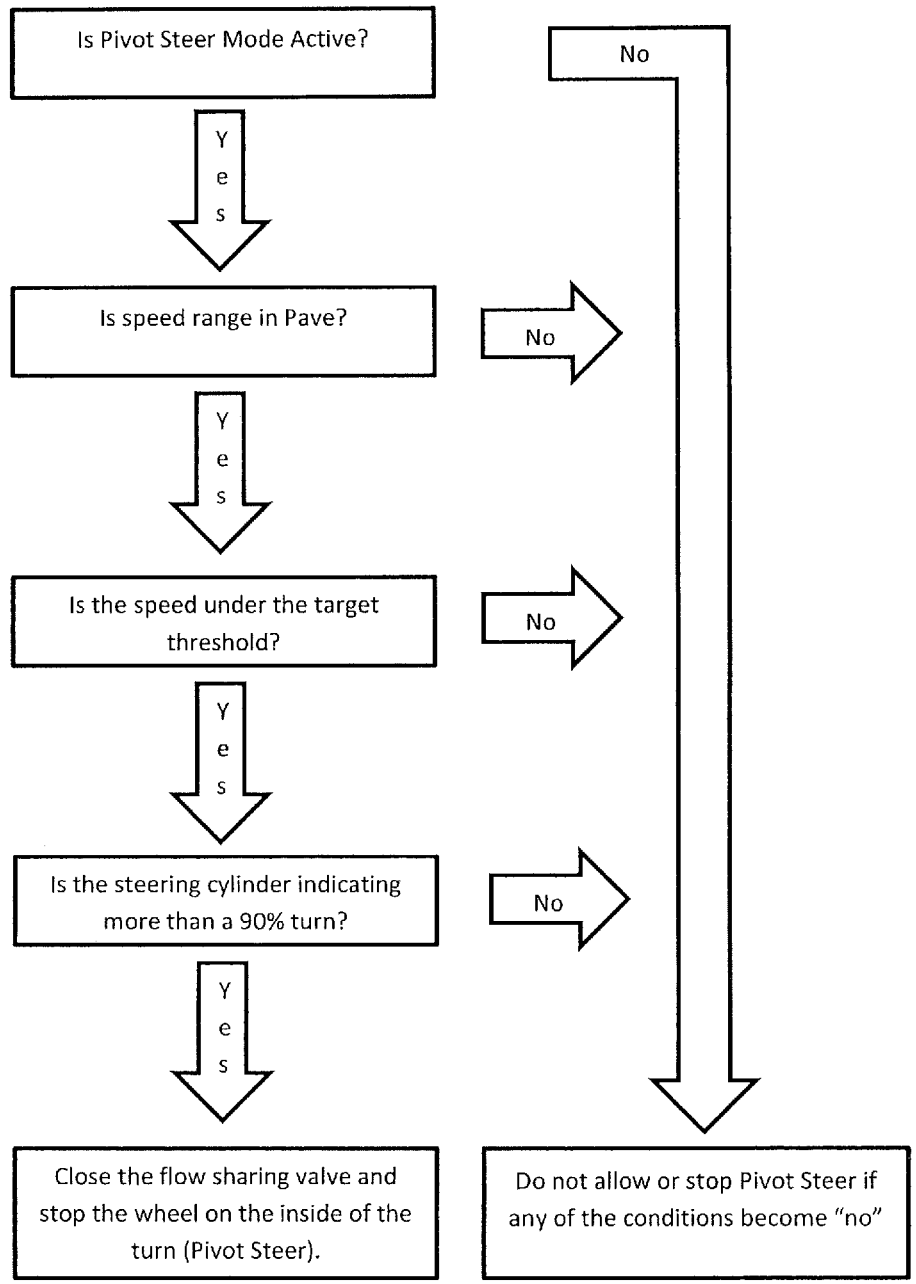
FIG. 6 is a flow chart illustrating the preferred method for controlling the steering of a paving machine.

Referring now to FIG. 6, a flow chart illustrating another preferred method for controlling the steering of a paving machine is illustrated. As shown in FIG. 6, initially the steering control system determines if the paving machine is in automatic pivot steer mode. If the paving machine is not in automatic pivot steer mode, then the steering control system prevents the paving machine from pivot steering. If, on the other hand, the paving machine is in the automatic pivot steer mode, then the steering control system determines if the paving machine speed is within the paving machine speed range. If the paving machine speed is not within the paving machine speed range, then the steering control system prevents the paving machine from pivot steering. If, on the other hand, the paving machine speed is within the paving machine speed range, then the steering control system determines if the paving machine speed is below the target threshold speed. If the paving machine speed is not below the target threshold speed, then the steering control system will prevent the paving machine from pivot steering. If, on the other hand, the paving machine speed is below the target threshold speed, then the steering control system determines if the steering cylinder sensor is indicating a more than eighty percent (80%) turn. If the steering control system determines that the steering cylinder sensor is not indicating a more than eighty percent (80%) turn, then the system prevents the paving machine from pivot steering. If, on the other hand, the steering control system determines that the steering cylinder sensor is indicating a more than eighty percent (80%) turn, then the steering control system closes the flow sharing valve and stops the rotation of the rear wheel on the inside of the turn.

In operation, several advantages of the preferred embodiments of the steering control system are achieved. For example, the preferred embodiments of the invention claimed herein provide an apparatus and method for a steering control system that automatically pivot steers the paving machine. The preferred embodiments of the invention claimed herein also provide an apparatus and method for a steering control system that is not undesirably labor-intensive and unsafe. The preferred embodiments of the invention claimed herein further provide an apparatus and method for a steering control system that does not allow for pivot steering at any time the paving machine is moving and regardless of the machine's wheel position. The preferred embodiments of the invention claimed herein still further provide an apparatus and method for a steering control system that does not produce undesirable stress on a stationary wheel and its linkage when a pivoting wheel turns or damage the base pavement. In addition, the preferred embodiments of the invention claimed herein provide an apparatus and method for a steering control system that is not be capable of being accidentally engaged at an unsafe speed and possibly throw the operator off the paving machine.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A steering control system adapted for use on a paving machine having one or more wheels and an automatic pivot steer mode, said steering control system comprising:
   (a) a speed sensor, said speed sensor being adapted to determine a paving machine speed;
   (b) a steering cylinder, said steering cylinder being adapted to move between a straight forward position and a fully turned position;
   (c) a steering cylinder sensor, said steering cylinder sensor being adapted to determine a steering cylinder position;
   (d) a flow sharing valve, said flow sharing valve being in fluid communication with one or more of the one or more wheels and being adapted to be moved between an open position and a closed position;
   (e) a controller, said controller being adapted to communicate with the speed sensor, the steering cylinder sensor, and the flow sharing valve;
   wherein the steering control system is adapted to automatically open and close the flow sharing valve.

2. The steering control system of claim 1 wherein the system automatically determines if the paving machine speed is within a paving machine speed range.

3. The steering control system of claim 2 wherein the paving machine speed range is between approximately zero feet per minute (0 fpm) and approximately four hundred feet per minute (400 fpm).

4. The steering control system of claim 2 wherein the system automatically deactivates the automatic pivot steer mode when the paving machine speed is not within the paving machine speed range.

5. The steering control system of claim 1 wherein the system automatically determines a target threshold speed.

6. The steering control system of claim 5 wherein the system automatically compares the paving machine speed with the target threshold speed.

7. The steering control system of claim 5 wherein the system automatically deactivates the automatic pivot steer mode when the paving machine speed exceeds the target threshold speed.

8. The steering control system of claim 5 wherein the target threshold speed is between approximately zero feet per minute (0 fpm) and approximately three hundred fifty feet per minute (350 fpm).

9. The steering control system of claim 1 wherein the system automatically activates the automatic pivot mode when the steering cylinder position is approximately eighty percent (80%) to approximately one hundred percent (100%) in the fully turned position.

10. The steering control system of claim 1 wherein the system is adapted to automatically stop the rotation of one or more of the one or more wheels.

11. The steering control system of claim 1 wherein the paving machine further comprises a joystick.

12. The steering control system of claim 11 wherein the joystick controls the forward-reverse movement of the paving machine.

13. A steering control system adapted for use on a paving machine having one or more wheels, a joystick, and an automatic pivot steer mode, said steering control system comprising:
   (a) a speed sensor, said speed sensor being adapted to determine a paving machine speed;
   (b) a steering cylinder, said steering cylinder being adapted to move between a straight forward position and a fully turned position;
   (c) a steering cylinder sensor, said steering cylinder sensor being adapted to determine a steering cylinder position;
   (d) a flow sharing valve, said flow sharing valve being in fluid communication with one or more of the one or more wheels and being adapted to be moved between an open position and a closed position;
   (e) a controller, said controller being adapted to communicate with the speed sensor, the steering cylinder sensor, and the flow sharing valve;
   wherein the steering control system is adapted to automatically open and close the flow sharing valve.

14. A method for controlling the steering of a paving machine having one or more wheels and an automatic pivot steer mode, said method comprising:
   (a) providing a steering control system, said steering control system comprising:
      (i) a speed sensor, said speed sensor being adapted to determine a paving machine speed;
      (ii) a steering cylinder, said steering cylinder being adapted to move between a straight forward position and a fully turned position;
      (iii) a steering cylinder sensor, said steering cylinder sensor being adapted to determine a steering cylinder position;
      (iv) a flow sharing valve, said flow sharing valve being in fluid communication with one or more of the one or more wheels and being adapted to be moved between an open position and a closed position;

(v) a controller, said controller being adapted to communicate with the speed sensor, the steering cylinder sensor, and the flow sharing valve;
wherein the steering control system is adapted to automatically open and close the flow sharing valve;
(b) automatically moving the flow sharing valve between the open position and the closed position.

15. The method of claim 14 further comprising automatically determining a paving machine speed.

16. The method of claim 15 further comprising automatically determining a target threshold speed.

17. The method of claim 16 further comprising automatically determining the steering cylinder position.

18. The method of claim 17 further comprising automatically comparing the paving machine speed with a paving machine speed range and automatically comparing the paving machine speed with the target threshold speed.

19. The method of claim 17 further comprising automatically comparing the steering cylinder position with the fully turned position.

20. The method of claim 14 further comprising automatically stopping the rotation of one or more of the one or more wheels.

\* \* \* \* \*